United States Patent Office 2,878,198
Patented Mar. 17, 1959

2,878,198

QUICK-DRYING OLEORESINOUS COATING COMPOSITIONS CONTAINING RESORCINOL-p-ALKYLPHENOL-ALDEHYDE RESINS AND A PROCESS OF PREPARING THESE RESINS

Alvin R. Ingram, Glenshaw, and Charles N. Irvine, Pittsburgh, Pa., assignors to Koppers Company, Inc., a corporation of Delaware No Drawing. Application June 28, 1954
Serial No. 439,896

14 Claims. (Cl. 260—19)

This invention relates in general to oleoresinous coating compositions. More particularly this invention is directed to quick-drying coating compositions containing resorcinol-p-alkylphenol-aldehyde resins together with drying oils. Additionally this invention relates to a process for preparing these resorcinol-p-alkylphenol-aldehyde resins.

Heretofore oleoresinous coating compositions including varnishes and paints have been extensively manufactured and utilized. These coating compositions have in general proven to be satisfactory. However, extensive research has been conducted in the last few years in an effort to improve these oleoresinous varnishes and paints, particularly with regard to improving their drying time. Many of these prior art compositions have also left room for improvement so far as their process of manufacture is concerned. For example, the cooking or "bodying" operation in the preparation of many of these oleoresinous varnishes and paints has consumed rather prolonged periods of time which, of course, has not been desirable from an economic standpoint.

It is therefore an object of this invention to provide a quick-drying oleoresinous coating composition containing a resorcinol-p-alkyl-phenol-formaldehyde resin combined with a drying oil.

Another object of this invention is to provide a quick-drying oleoresinous coating composition containing a resorcinol-p-alkyl-phenol-formaldehyde resin combined with a drying oil, which oleoresinous composition is particularly advantageous in that its process of manufacture involves a relatively short or decreased "cooking" or "bodying" time.

Still another object of this invention is to provide a quick-drying oleoresinous coating composition containing a resorcinol-p-alkylphenol-formaldehyde resin together with a drying oil which is advantageous from an economic standpoint.

A further object is to provide a process for the preparation of an improved resorcinol-p-alkylphenol-aldehyde resin.

Ancillary and additional objects and advantages, if not specifically set forth herein, will be readily apparent as the invention is hereinafter described in more detail.

The resorcinol-p-alkylphenol-aldehyde resins of this invention are prepared by first condensing a p-alkylphenol wherein the alkyl group contains at least 4 carbon atoms and an aldehyde such as, for example, formaldehyde, in the presence of heat and an alkaline catalyst, and thereafter heat-reacting resorcinol with this preformed condensation product for a period of time sufficient to react substantially all the resorcinol with the preformed condensation product.

The constituents can be reacted in the molar ratio range of 0.01–0.65 mole of resorcinol to 0.99–0.35 mole of p-tert-butylphenol to 0.50–0.85 mole of formaldehyde so as to give a ratio of 1 mole total of resorcinol and p-tert-butylphenol to 0.50–0.85 mole of formaldehyde. An advantageous molar ratio range is .33–.50 mole of resorcinol to .67–.50 mole of p-tert-butylphenol to .63–.70 mole of formaldehyde. A particularly desirable molar ratio is .50–.50–.65 respectively.

The amount of alkaline catalyst which is utilized is a small amount and can vary from about .1% by weight based on the p-alkylphenol to about 1 equivalent of alkaline catalyst per phenolic hydroxy group present in the p-alkylphenol. At lower catalyst concentrations, higher temperatures are advantageously employed in carrying out the reactions. Lower temperatures can be advantageously employed in carrying out the condensation reactions when higher catalyst concentrations are utilized.

In practicing the instant process, a p-alkylphenol such as, for example, p-tert-butylphenol and preferably an aldehyde such as, for example, formaldehyde are reacted together at a temperature of from room temperature to reflux in the presence of an alkaline catalyst such as, for example, sodium hydroxide until substantially all of the formaldehyde has reacted (as determined by the test method entitled "Formaldehyde Determination, Using Hydroxylamine Hydrochloride" appearing in Experimental Plastics and Synthetic Resins, by G. F. D'Alelio (1947), pages 163–164). The formaldehyde is advantageously added to the p-alkylphenol as an aqueous solution although it can be added directly as a gas, if desired. If desired, paraformaldehyde, trioxane, other polyoxymethylenes, and materials which will liberate formaldehyde under the conditions set forth in the specification such as hexamethylene tetramine, methylol, acetal, etc., can be added to the p-alkylphenol instead of an aqueous solution of formaldehyde or formaldehyde gas. Obviously the length of time required for this condensation reaction to go to completion will depend on the temperature employed. At reflux temperatures, the reaction is completed in from approximately 6–12 hours. However at room temperature, the condensation might take as long as 72 hours. The reaction mixture containing the p-tert-butylphenol-formaldehyde condensation product produced is then reacted with resorcinol at a temperature of from approximately 50° C. to reflux and maintained within this temperature range until substantially all the resorcinol has reacted which can take from 2–12 hours. The reaction product can then be neutralized by means of any suitable acid such as, for example, acetic acid, if desired, and then washed with water and devolatilized by, for example, subjecting the washed reaction product to reduced pressure and heating to a temperature of approximately 100–105° C. The water utilized in the washing is advantageously hot water, for example, water heated to about 175° F. The washed resin is then advantageously dehydrated under reduced pressure to a water content of less than about 1% by weight.

The following procedure is followed in determining when the resorcinol has been consumed although other suitable procedures for making this determination can be employed: A 10 gram sample of the reaction mixture is diluted with 25 ml. of water and the pH is adjusted to 5 with dilute hydrochloric acid. To complete precipitation of the resin, 10 grams of granular sodium chloride is added. The solid is removed by filtration and the filtrate is extracted with three 25 ml. portions of diethyl ether. The ether solution is dried with sodium sulfate. The dried ether solution is placed in a 100 ml. flask and devolatilized at from 20–50° C. by water pump suction. The residue containing over 80% resorcinol is flash-sublimed at 120° C. and 0.8 mm. of mercury pressure. Resorcinol is collected in high purity in an air-cooled ground glass gooseneck adapter attached to the flask.

The product resorcinol-p-alkylphenol-aldehyde condensation products produced in accordance with the novel process of this invention are characterized by being thermoplastic, permanently fusible, brittle and acetone-soluble resins.

It is to be understood that other resin-forming prior art aldehydes may be utilized in place of formaldehyde in carrying out the reaction with the p-alkylphenol and resorcinol. For example, acetaldehyde, paraldehyde, propyl aldehyde, butyl aldehyde, furfuraldehyde, etc., can be utilized.

Other alkaline catalysts that can be utilized in place of the sodium hydroxide, if desired, include, for example, potassium hydroxide, calcium hydroxide, barium hydroxide, ammonia, pyridine, piperidine, triethanol amine, etc.

The following examples are provided as being illustrative of the novel process of this invention:

Example I p-tert-Butylphenol (0.67 mole) is dissolved at 50° C. in a 6.35% solution of sodium hydroxide (0.67 mole) in water. A 37% solution of formaldehyde in water (0.65 mole) is added to the reaction mixture and the mixture is heated for 10 hours at 50° C. At this time 98% of the formaldehyde is consumed (analysis by hydroxylamine hydrochloride method). Resorcinol (0.33 mole) is added to the reaction mixture and the temperature is raised to 95° C. in one hour. Heating is continued at 95° C. for 6 additional hours, at which time 0.31 mole of resorcinol is consumed. The solubility of the resin in alkali-refined linseed oil (1 part of resin, 2 parts of linseed oil) is then determined. A clear, dark-red solution is obtained at 75°–125° C.

Example II p-tert-Butylphenol (0.50 mole) is dissolved at 50° C. in an aqueous solution of sodium hydroxide (.50 mole). A 37% solution of formaldehyde in water (0.65 mole) is added to the reaction mixture and the mixture heated at 50° C. for 12 hours. The product thus produced is then condensed with 0.50 mole of resorcinol at 95° C. for 7 hours. The resin is neutralized with acetic acid, washed with water and dehydrated at 100–105° C. in the presence of a vacuum created by waterpump suction. The solubility of the resin in alkali-refined linseed oil (1 part of resin, 2 parts of linseed oil) is then determined. A clear, dark-red solution is obtained at 100–150° C.

Broadly, the oleoresinous coating compositions of this invention comprise a resorcinol-p-alkylphenol-formaldehyde resin combined with a drying oil.

More specifically the novel oleoresinous varnishes or paints advantageously embody a resorcinol-p-tert-butylphenol-formaldehyde resin obtained by the procedure described above together with a drying oil.

A weight ratio of resin to drying oil ranging from greater than about 1:1 to not more than about 1:3.3 can be utilized. A weight ratio of resin to oil of approximately 1:2 produces a varnish or paint having particularly desirable properties with regard to drying time and "cooking" or "heat-bodying" time. The drying oil is advantageously alkali-refined linseed oil. However raw linseed oil or one of the specially prepared grades which can be obtained on the market can be utilized, if desired, and is considered to be within the spirit and scope of this invention.

It is to be understood that other oils can be utilized in the novel varnish or paint compositions of this invention in place of linseed oil. Drying and semi-drying fatty oils such as, for example, soyabean oil, oiticia oil, perilla oil, poppyseed oil, fish oil, tung oil, dehydrogenated castor oil and/or mixtures thereof can be utilized in these compositions. Both the drying and semi-drying fatty oils are referred to collectively herein as "drying oils."

The varnishes or paints of this invention can be thinned by means of any suitable volatile hydrocarbon thinner such as, for example, toluene, naphtha, petroleum distillates, benzene, turpentine, xylene, etc.

Any of the conventional driers utilized in this art for drying oleoresinous varnishes or paints which primarily contain unsaturated oil as the oil constituent can be employed in our novel varnishes, if desired. Driers eminently adapted for this purpose include, for example, lead, cobalt or manganese compounds such as, for example, the lead, cobalt, manganese, naphthenates, etc., or mixtures thereof. Although the amounts of these driers which can be utilized can obviously be varied, excellent results have been obtained by utilizing 0.50% by weight lead naphthenate and 0.10% by weight cobalt naphthenate (based on the weight of the resin and oil). Pigments, dyes, fillers, etc., can also be added to the varnish or paint, if desired.

The following example is illustrative of a typical procedure for the preparation of the novel varnish or paint but is in no way restrictive:

Twenty parts by weight of a resorcinol-p-tert-butylphenol-formaldehyde resin such as is prepared by reacting resorcinol, p-tert-butylphenol, and formaldehyde in a mole ratio of 0.50:0.50:0.65 respectively as is hereinbefore described as mixed with 40 parts by weight of alkali-refined linseed oil in a stainless steel container by heating to 100–150° C. After the resin has dissolved and foaming has ceased, the temperature of the mixture is raised slowly to approximately 220–250° C. and maintained at that temperature until a 6–8 inch vertical string is obtained. This test is performed by placing a small sample of the hot resin on a glass plate, allowing the resin to cool to approximately room temperature, touching the flat side of a cool spatula to the resin, and withdrawing the spatula. The distance to which the thread of resin can be drawn before breaking is known as the string length. When a 6–8 inch string is obtained, the heat is withdrawn and the reaction mixture is allowed to cool to about 240°–160° C. The resinous product is then diluted with 100–110 parts by weight of a solvent mixture containing 0.5% lead naphthenate and 0.1% cobalt naphthenate. The solvent mixture consists of 25 parts by weight of toluene and 75 parts by weight of a solvent naphtha boiling at approximately 155–205° C. such as a product obtainable as Gulf Stoddard Solvent.

The following table of data is illustrative of the superiority of our novel oleoresinous varnishes or paints containing resorcinol-p-tert-alkylphenol formaldehyde as the resin constituent over the well-known phenolformaldehyde coating compositions in two important aspects, viz., "cooking" or "bodying" time and drying time to a tack-free film. All of the varnishes or paints in the following table were prepared by reacting 1 part of resin with 2 parts of alkali-refined linseed oil.

| Resin | Cooking Time [a] Under Nitrogen at 305–310°C. to a One-Inch String, minutes | Cooking Time [a] Under Nitrogen at 305–310°C. to a Six-Inch String, minutes | Tack-Free Time [b] of Air-Dried Film, hours |
|---|---|---|---|
| Resorcinol-p-tert-butyl-phenol-formaldehyde (mole ratio=0.47/0.53/0.69) | 3 | 23 | 1.8 |
| Resorcinol-p-tert-butyl-phenol-formaldehyde (mole ratio=0.32/0.68/0.66) | 20 | 30 | 3.5 |
| p-tert-butylphenol-formaldehyde (Bakelite BR–9432) | 39 | 65 | 5.5 |

[a] Heat-up time to 305°C.=1 hour.
[b] Cast from solution (spec. gravity=about 0.84) in 25/75 toluene—Gulf Stoddard Solvent containing 0.50% lead and 0.10% coablt as Harshaw Uversol Driers. Drier concentrations were based on combined resin and oil.

Bakelite BR–9432 is obtainable from the Bakelite Division of the Union Carbide and Carbon Corporation.

Other resorcinol-p-alkylphenol-formaldehyde resins can be employed in the varnish or paint compositions of this invention in place of the previously-described resorcinol-p-tert-butylphenol-formaldehyde resins. For example resorcinol-p-octylphenol-formaldehyde resins; resorcinol-p-nonylphenol-formaldehyde resins; resorcinol-p-amylphenol-formaldehyde; resorcinol-p-hexylphenol-formaldehyde; resorcinol-p-heptylphenol-formaldehyde; etc., can be utilized. A preferred resin for utilization in the novel varnish or paint of this invention is a resorcinol-p-tert-butylphenol-formaldehyde resin obtained by reacting the constituents as previously described in a mole ratio of 0.50:0.50:0.65 respectively.

The novel varnish or paints of this invention, in addition to exhibiting a superior or excellent "cooking" or "bodying" time and a superior tack-free drying time, are further characterized by producing films of excellent hardness, good resistance to boiling water, and excellent resistance to a 5% solution of sodium hydroxide at 30° C. These varnishes or paints also exhibit an excellent shelf or non-skin-forming time as is evidenced by no skin forming on a one-inch layer of the varnish in a 2" by 1" glass jar after 90 days.

The term "cooking time" or "bodying time" is used herein to designate the time required for heating the resin-oil mixture at 305–310° C. to a certain length string, for example, a six-inch string.

What is claimed is:

1. A process of producing an oil-soluble resin comprising: condensing a p-alkylphenol wherein the alkyl group contains at least 4 carbon atoms and formaldehyde in the presence of an alkaline catalyst at a temperature of from room temperature to reflux temperature until substantially all of the formaldehyde has reacted to form a reaction mixture containing a p-alkylphenol-formaldehyde condensation product; and thereafter reacting resorcinol at a temperature of from about 50° C. to reflux temperature with said reaction mixture for a period of time sufficient to react the resorcinol with said condensation product; said resorcinol, p-alkylphenyl and formaldehyde being reacted in the molar ratio range of from 0.01:0.99:0.50 to 0.65:0.35:0.85 respectively.

2. A process of producing an oil-soluble resin comprising: condensing a p-tert-butylphenol and formaldehyde in the presence of a sodium hydroxide catalyst at a temperature of from room temperature to reflux temperature until substantially all of the formaldehyde has reacted to form a reaction mixture containing a p-tert-butyphenol-formaldehyde condensation product, and thereafter reacting resorcinol at a temperature of from about 50° C. to reflux temperature with said reaction mixture for a period of time sufficient to react the resorscinol with said condensation product; said resorcinol, p-tert-butylphenol and formaldehyde being reacted in the molar ratio range of from 0.01:0.99:0.50 to 0.65:0.35:0.85 respectively.

3. A process of producing an oil-soluble resin comprising: condensing a p-tert-butylphenol and formaldehyde in the presence of a sodium hydroxide catalyst at a temperature of from room temperature to reflux temperature until substantially all of the formaldehyde has reacted to form a reaction mixture containing a p-tert-butylphenol-formaldehyde condensation product and thereafter reacting resorcinol at a temperature of from about 50° C. to reflux temperature with said reaction mixture for a period of time sufficient to react the resorcinol with said condensation product; said resorcinol, p-tert-butylphenol and formaldehyde being reacted in the molar ratio range of from 0.33:0.67:0.63 to 0.50:0.50:0.70 respectively.

4. An oleoresinous coating composition comprising a resorcinol-p-alkylphenol-formaldehyde condensation product, said alkyl group containing from 4–9 carbon atoms, prepared in accordance with the process of claim 1 and a drying oil, the weight ratios of said condensation product to drying oil ranging from greater than about 1:1 to not more than about 1:3.3.

5. An oleoresinous coating composition comprising a resorcinol-p-tert-butylphenol-formaldehyde condensation product prepared in accordance with the process of claim 3 and a drying oil, the weight ratio of said condensation product to drying oil ranging from greater than about 1:1 to not more than about 1:3.3.

6. An oleoresinous coating composition comprising a resorcinol-p-tert-butylphenol-formaldehyde condensation product prepared in accordance with the process of claim 3 and linseed oil, the weight ratio of said condensation product to linseed oil ranging from greater than about 1:1 to not more than about 1:3.3.

7. An oleoresinous coating composition comprising approximately one part of a resorcinol-p-tert-butylphenol-formaldehyde condensation product prepared in accordance with the process of claim 3 and approximately two parts of linseed oil.

8. An oleoresinous coating composition comprising approximately one part of a resorcinol-p-tert-butylphenol condensation product prepared in accordance with the process of claim 3 combined with approximately two parts of linseed oil and a volatile solvent.

9. A process of producing an oil-soluble resin comprising: condensing a p-alkylphenol wherein the alkyl group contains at least 4 carbon atoms and formaldehyde in the presence of an alkaline catalyst at a temperature of from room temperature to reflux temperature until substantially all of the formaldehyde is reacted to form a reaction mixture containing a p-alkylphenol-formaldehyde condensation product; reacting resorcinol at a temperature of about 50° C. to reflux temperature with the reaction mixture for a period of time sufficient to react the resorcinol with said condensation product; said resorcinol, p-alkylphenol and formaldehyde being reacted in the molar ratio range of from 0.01:0.99:0.50 to 0.65:0.35:0.85 respectively; neutralizing the reaction mass with an acid; washing said reaction mass with water; and thereafter devolatilizing the washed reaction mass.

10. A process of producing an oil-soluble resin comprising: condensing a p-tert-butylphenol and formaldehyde in the presence of a sodium hydroxide catalyst at a temperature of from room temperature to reflux temperature until substantially all of the formaldehyde is reacted to form a reaction mixture containing a p-tert-butylphenol condensation product; reacting resorcinol at a temperature of about 50° C. to reflux temperature with the reaction mixture for a period of time sufficient to react with resorcinol with said condensation product; said resorcinol, p-tert-butylphenol and formaldehyde being reacted in the molar ratio range of from 0.01:0.99:0.50 to 0.65:0.35:0.85 respectively; neutralizing the reaction mass with an acid; washing said reaction mass with water; and thereafter devolatilizing the washed reaction mass.

11. A process of producing an oil-soluble resin comprising: condensing a p-tert-butylphenol and formaldehyde in the presence of a sodium hydroxide catalyst at a temperature of from room temperature to reflux temperature until substantially all of the formaldehyde is reacted to form a reaction mixture containing a p-tert-butylphenol condensation product; reacting resorcinol at a temperature of about 50° C. to reflux temperature with the reaction mixture for a period of time sufficient to react the resorcinol with said condensation product, said resorcinol, p-tert-butylphenol and formaldehyde being reacted in the molar ratio ranges of from 0.33:0.67:0.63 to 0.50:0.50:0.70 respectively; neutralizing the reaction mass with an acid; washing said reaction mass with water; and thereafter dehydrating the washed reaction mass.

12. The product of the process of claim 9.

13. The product of the process of claim 10.
14. The product of the process of claim 11.

References Cited in the file of this patent
UNITED STATES PATENTS

| | | |
|---|---|---|
| 1,889,751 | Kessler | Dec. 6, 1932 |
| 2,101,944 | Honel | Dec. 14, 1937 |
| 2,489,336 | Spahr et al. | Nov. 29, 1949 |
| 2,513,614 | Barkhuff | July 4, 1950 |
| 2,676,158 | Renfrew | Apr. 20, 1954 |

UNITED STATES PATENT OFFICE
CERTIFICATE OF CORRECTION

Patent No. 2,878,198                                                        March 17, 1959

Alvin R. Ingram et al.

It is hereby certified that error appears in the printed specification of the above numbered patent requiring correction and that the said Letters Patent should read as corrected below.

Column 2, line 1, for ".63-70" read -- .63-.70 --; column 4, line 24, for "as mixed" read -- is mixed --; column 5, line 40, for "p-alkylphenyl" read -- p-alkylphenol --; column 6, line 52, for "react with" read -- react the --.

Signed and sealed this 28th day of July 1959.

(SEAL)
Attest:

KARL H. AXLINE                                                   ROBERT C. WATSON

Attesting Officer                                             Commissioner of Patents